US008702520B2

(12) United States Patent
Seelig et al.

(10) Patent No.: US 8,702,520 B2
(45) Date of Patent: Apr. 22, 2014

(54) TOURNAMENT GAMING SYSTEM

(75) Inventors: Jerald C. Seelig, Absecon, NJ (US); Lawrence M. Henshaw, Hammonton, NJ (US)

(73) Assignee: IGT, Las Vegas, NV (US)

( * ) Notice: Subject to any disclaimer, the term of this patent is extended or adjusted under 35 U.S.C. 154(b) by 1158 days.

(21) Appl. No.: 12/027,939

(22) Filed: Feb. 7, 2008

(65) Prior Publication Data

US 2008/0188312 A1 Aug. 7, 2008

Related U.S. Application Data

(60) Provisional application No. 60/888,714, filed on Feb. 7, 2007.

(51) Int. Cl.
*A63F 9/24* (2006.01)
*G06F 17/00* (2006.01)

(52) U.S. Cl.
USPC .................. 463/42; 463/16; 463/25; 273/292

(58) Field of Classification Search
None
See application file for complete search history.

(56) References Cited

U.S. PATENT DOCUMENTS 6,126,542 A 10/2000 Fier
6,364,765 B1 4/2002 Walker et al.
6,652,378 B2 11/2003 Cannon et al.
6,764,398 B2 7/2004 Stone et al.
6,843,724 B2 1/2005 Walker et al.
6,860,810 B2 3/2005 Cannon et al.
6,981,917 B2 1/2006 Webb et al.
7,033,272 B1 4/2006 Mason
7,081,050 B2 7/2006 Torontino
7,748,714 B2 * 7/2010 Nicely et al. .................. 273/292
2005/0043088 A1 * 2/2005 Nguyen et al. .................. 463/29
2005/0054419 A1 3/2005 Souza et al.
2005/0148380 A1 * 7/2005 Cannon et al. .................. 463/16
2005/0181856 A1 * 8/2005 Cannon et al. .................. 463/16
2006/0019743 A1 1/2006 Roemer
2006/0019744 A1 1/2006 Roemer
2006/0030959 A1 2/2006 Duhamed
2006/0040735 A1 2/2006 Baerlocher
2006/0131810 A1 * 6/2006 Nicely .......................... 273/292
2007/0015572 A1 1/2007 Baerlocher
2007/0259709 A1 * 11/2007 Kelly et al. ..................... 463/20
2008/0108404 A1 * 5/2008 Iddings et al. .................. 463/16
2010/0056261 A1 * 3/2010 Englman et al. ................ 463/25

* cited by examiner

*Primary Examiner* — Paul A D'Agostino
(74) *Attorney, Agent, or Firm* — Foley & Lardner LLP

(57) ABSTRACT

A network gaming system and method including a server having plural regular games for selection, and plural tournament games for plural players. The system also has plural gaming devices each in communication with the server to conduct a selected regular game upon receipt of a regular wager, and to enter a first tournament game upon receipt of a first tournament wager, and to simultaneously enter a second tournament game upon receipt of a second tournament wager. The system also has a payout system to award a regular game winning player a regular prize, and to award a tournament winning player a tournament prize.

23 Claims, 6 Drawing Sheets

TOURNAMENT GAMING SYSTEM

CROSS REFERENCE TO RELATED AND CO-PENDING APPLICATIONS

This patent application claims priority to U.S. Provisional Patent Application Ser. No. 60/888,714, filed on Feb. 7, 2007, the entire contents of which are herein incorporated by reference.

FIELD OF THE INVENTION

The present invention relates to a gaming system including a method and an apparatus for a casino patron to simultaneously play in several tournaments from a single gaming device.

BACKGROUND

In the past, tournament play allowed patrons to play a regular, base game along with playing in a multi-patron tournament. Tournaments were conducted at a single casino location, or at multiple gaming sites. Unfortunately, tournament play restricted patrons to playing in a single tournament, having a single group of participants, a single set of rules, a single set of winning criteria, and a single set of prizes. Typically, tournament play was also restricted to each player playing the same game. Thus, it was difficult to create player excitement and encourage patrons to make more tournament wagers.

SUMMARY OF ONE EMBODIMENT OF THE INVENTION

A network gaming system and method including a server having plural regular games for selection, and plural tournament games for plural players. The system also has plural gaming devices each in communication with the server to conduct a selected regular game upon receipt of a regular wager, and to enter a first tournament game upon receipt of a first tournament wager, and to simultaneously enter a second tournament game upon receipt of a second tournament wager. A tournament wager is a wager placed by the player specifically for participating in a particular tournament. Generally, if the player is participating in more than one tournament, a separate wager is placed for each tournament prior to each play of the gaming device. The tournament wager may be separate from the local wager on the gaming device for play of the local game on the gaming device. However, a single wager having a predetermined amount allocated for play on the local gaming device and a second predetermined amount allocated for wagering on a tournament is anticipated, allowing faster play where the player makes a single wager action for wagering on both local and tournament games including one or more tournaments. The system also has a payout system to award a regular game winning player a regular prize, and to award a tournament winning player a tournament prize.

The present invention comprises a network gaming system with a server and a plurality of gaming devices in communication with the server. Each of the gaming devices is configured to operate a game program that allows players to place wagers and play games. The server may store game programs and information, which can be downloaded to the gaming devices and gaming devices may transmit information to the server. The gaming device may offer a plurality of different games. When a player selects one of the games, the selected game may be downloaded from the server along with game related information, such as pay tables. Pay tables are used to determine the outcome of each game and they control the odds of winning a game and the amounts paid out. The gaming devices may be in one location, such as a casino, or they may be in different locations.

The present invention allows players to engage in continuous tournament play while playing a slot machine. In addition to a primary game, each gaming device offers one or more secondary tournament games. A tournament game allows a plurality of players to compete against each other under a defined set of rules usually as a supplement to play on the selected local gaming device. The tournament may comprise a series of games that players play, the total of which is used to compare to other players to determine the outcome to win a separate tournament prize. A player is eligible to participate in a tournament by placing an additional wager on the game. A player may win a tournament by playing more games than any other player in the tournament during a period of time. Alternatively, a player may win a tournament by having the highest total wagers placed during a period of time. In another embodiment a player may win a tournament by achieving certain outcomes in the primary game.

ADVANTAGES OF ONE OR MORE EMBODIMENTS OF THE PRESENT INVENTION

The various embodiments of the present invention may, but do not necessarily, achieve one or more of the following advantages:

Increase player excitement;

Encourage players to play more;

Encourage players to play longer; and

Generate more revenue for the system operator.

The above description sets forth, rather broadly, a summary of one embodiment of the present invention so that the detailed description that follows may be better understood and contributions of the present invention to the art may be better appreciated. Some of the embodiments of the present invention may not include all of the features or characteristics listed in the above summary. There are, of course, additional features of the invention that will be described below and will form the subject matter of claims. In this respect, before explaining at least one preferred embodiment of the invention in detail, it is to be understood that the invention is not limited in its application to the details of the construction and to the arrangement of the components set forth in the following description or as illustrated in the drawings.

The invention is capable of other embodiments and of being practiced and carried out in various ways. Also, it is to be understood that the phraseology and terminology employed herein are for the purpose of description and should not be regarded as limiting.

DESCRIPTION OF CERTAIN EMBODIMENTS OF THE PRESENT INVENTION

In the following detailed description of the embodiments, reference is made to the accompanying drawings, which form a part of this application. The drawings show, by way of illustration, specific embodiments in which the invention may be practiced. It is to be understood that other embodiments may be utilized and structural changes may be made without departing from the scope of the present invention.

Figure 1:
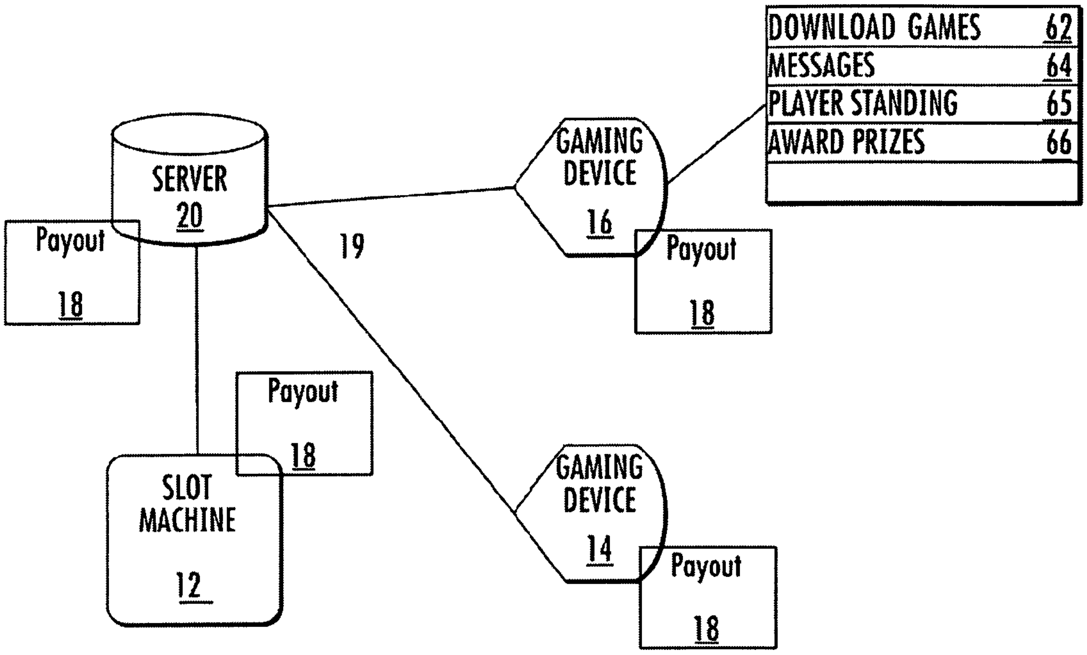
FIG. 1 is substantially a block diagram of one embodiment of a simultaneous tournament play gaming system including a server, and several embodiment of gaming devices.

FIG. 1 illustrates one embodiment of a simultaneous tournament play gaming system, implemented as a network gaming system 10 which may be used in a casino, or other gaming headquarters. The term “tournament” refers to a series of contests in which a number of contestants compete and the one that prevails through the final round or that finishes with the best record is declared the winner. For example, one form of a tournament may be a series of games that players play, the total of which is used to compare other players to determine the outcome. In one form, the tournament contestants may all be playing the same type of game, whereas in other embodiments, different games may be played, with the tournament contestants grouped by other factors, such as a time period of play, wager amounts, or other characteristics. Other equivalent schemes for conducting tournaments will become to those skilled in the art from the embodiments described below and the discussion herein which will form the subject matter of the claims.

Gaming system 10 may include a group of gaming devices, such as a slot machine 12, a touch screen gaming device 14, and a remote gaming device 16, such as a video poker machine. Each gaming device 12-16 may have its own payout device 18, or alternatively, it may be coupled as shown to a central server 20 connected payout device 18 by communication scheme 19 as described below. A variety of different types of gaming devices and payout devices are known to those skilled in the art. Each gaming device 12-16, along with payout device 18, are in communication with a casino server 20, as described further below. Before explaining the remaining items on FIG. 1, the construction of server 20 is discussed in detail.

Figure 2:
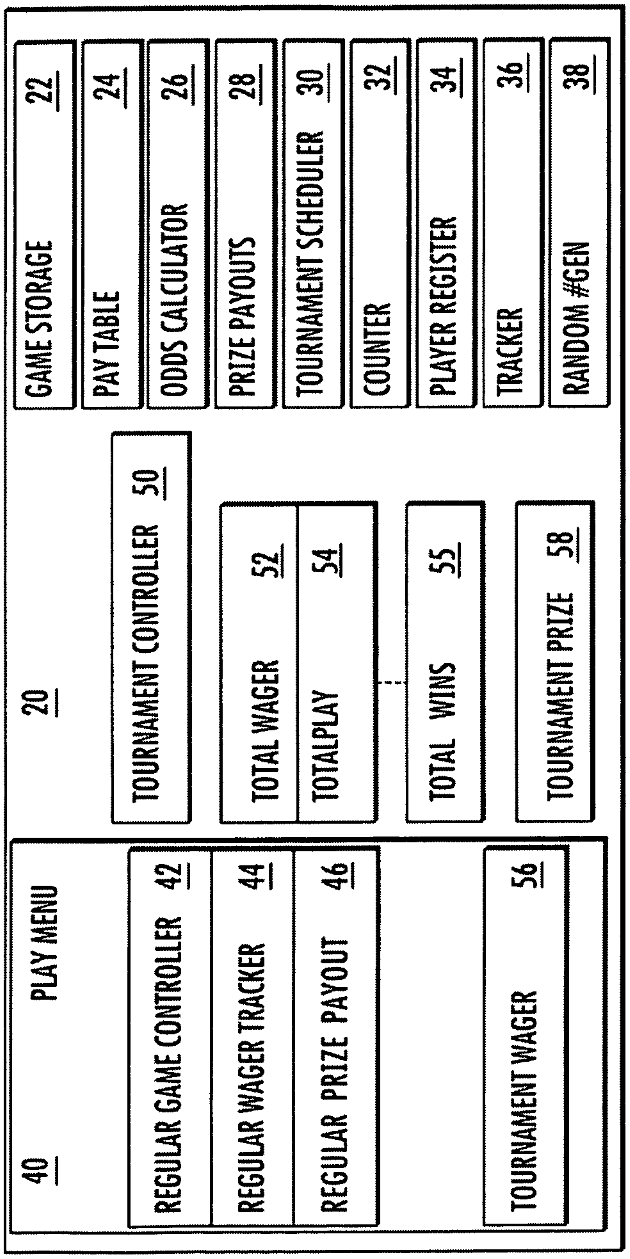
FIG. 2 is substantially a block diagram of one embodiment of the server of FIG. 1.

FIG. 2 illustrates one embodiment of server 20 as having a game storage portion 22 that stores a variety of different games of chance for selection by players of different gaming devices, such as touch screen device 14 or remote device 16. A pay table storage portion 24 stores a variety of different pay tables, each of which may be correlated with an odds calculator 26 and prize payouts 28. Server 20 may also include a tournament scheduler 30 which schedules when various tournaments are to begin. A counter 32 counts the number of games each tournament player has played. Tournament players may be allowed to enter identification information that is stored in a player register 34. A tracker 36 may be used to monitor the play of each registered player, including their wager amounts, total wages, frequency of wagers, number of wins, number of games played, total winnings, etc. Server 20 may also include a random number generator 38 which is used as described further below.

As used herein, the terms “player,” “user,” “patron” are used interchangeably and synonymously to indicate a person placing wagers at gaming devices 12-16. Operation of the apparatus and method described here and are illustrated as being owned and conducted by a casino, it is clear that other gaming establishments or headquarters may use these systems and methods, such as a state lottery provider.

The server 20 may also include a play menu 40 which has a primary, base or regular game controller 42. Regular game controller 42 as a regular wager tracker 44, which may be a separate component or a sub portion of tracker 36. Regular game controller 42 may also have a regular prize payout portion 46, which may be a separate component or a sub portion of prize payout 28. Play menu 40 may also include a tournament controller 50 which has a portion for accumulating total wagers 52, a portion for accumulating the total games played 54, a portion for accumulating the total number of wins 55, etc. Tournament controller 50 may also include a portion for accumulating the total tournament wagers 56, and a tournament prize table 58 which may award tournament prizes using payout device 18. The various tracked items 44 and 52-56 of play menu 40 may be output to, or a portion of, tracker 36.

Returning to FIG. 1, each gaming device 12-16 may include a video, LCD, or other type of display screen 60 (FIG. 3) for displaying images viewable by a player. For example, screen 60 may display a downloaded game 62 for play by a casino patron, and/or messages 64 to be sent to, or received from, server 20. Screen 60 may also display a player’s standing 65 in a tournament, as well as information about upcoming tournaments including tournament entry options. Each gaming device 12-16 may also include a prize awarding portion 66, which may be a discrete device or a centrally located member, such as payout device 18.

A variety of different modifications may be made by those skilled in the art to gaming devices 12-16 for use with server 20. For example, in the illustrated embodiment the slot machine 12 and touch screen gaming device 14 may be located within the same casino as server 20 and hardwired to the server as indicated by straight solid lines in FIG. 1. In contrast, the remote gaming device 16 may be located offsite from the casino, and coupled to server 20 via satellite, or via a communication network, such as the Internet 68, as indicated by interconnect lines in FIG. 1. A variety of different signal coupling schemes 19 for communication are known to those skilled in the art to facilitate communication between gaming devices 12-16 and server 20 including fiber optics, wireless systems, Ethernet, etc., and their equivalents.

The server 20 is configured to schedule tournaments, send messages to the gaming device 14 on the network 68 announcing the start of tournaments, register and track the play of all players entered in the tournament, cause the gaming device 14 to display the standing 65 of each player in the tournament and award prizes 66 to winners of the tournaments. The tournaments may be scheduled in accordance with predetermined set time periods so that players playing gaming device 14 in the casino are provided with the opportunity to enter many tournaments. In one embodiment, a new tournament may be offered every minute.

Figure 3:
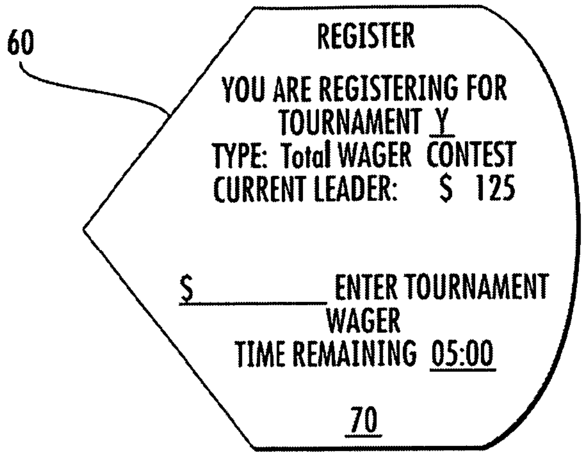
FIG. 3 is substantially a front view of one embodiment of a display screen portion of a gaming device of FIG. 1 before tournament play begins.

FIG. 3 illustrates display screen 60 showing one embodiment of a tournament registration image 70 where a player may enter a tournament. The players informed that they are registering for tournament Y, where the letter Y may designate a tournament name, number, difficulty level, etc. If the display screen 60 is a touch screen, a virtual button may be displayed for entering a tournament wager. Information about the current tournament standings leader may also be displayed by image 70. For example, for a total wager contest, the current leader may have already wagered $125. If the tournament is a timed event, image 70 may also indicate the time remaining in tournament Y, such as five minutes ("05: 00").

Figure 4:
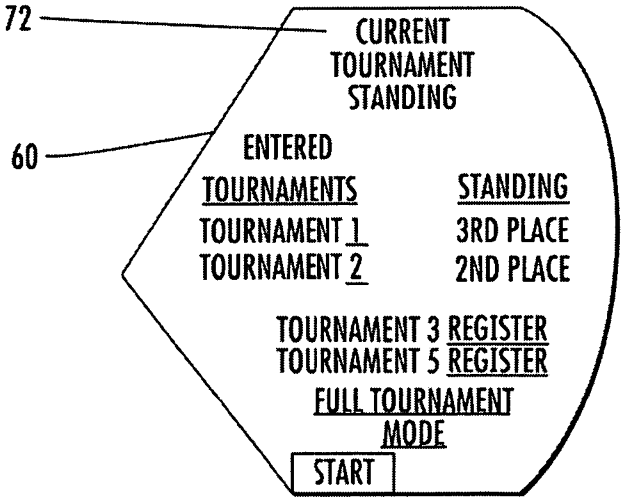
FIG. 4 is substantially a front view of another embodiment of a display screen portion of a gaming device of FIG. 1 after tournament play begins.

FIG. 4 illustrates display screen 60 showing one embodiment of a tournament standings image 72 which shows a player's current standing in two simultaneously conducted tournaments. The tournament standings image 72 may also show new upcoming tournaments or tournaments already underway, along with virtual buttons labeled "Register," which may be touched to enter additional tournaments.

A player may also be offered the option of entering a full tournament mode by touching a virtual "Start" button, as shown in image 72 of FIG. 4. During full tournament mode, wagers and prizes for the regular game may be suspended, so all wagers made are tournament wagers. In full tournament mode, the gaming device may offer the tournament player an option to suspend regular wagers and forfeit regular prizes during tournament play. In some implementations, a player may initially be allowed to enter full tournament mode, while in other cases, a player must first become eligible before being offered entry into full tournament mode, for example, based on player tracking, spending or wagering patterns or credits available to player. For example, eligibility may depend on the total amount wagered on both the regular game and tournament games.

Figure 5:
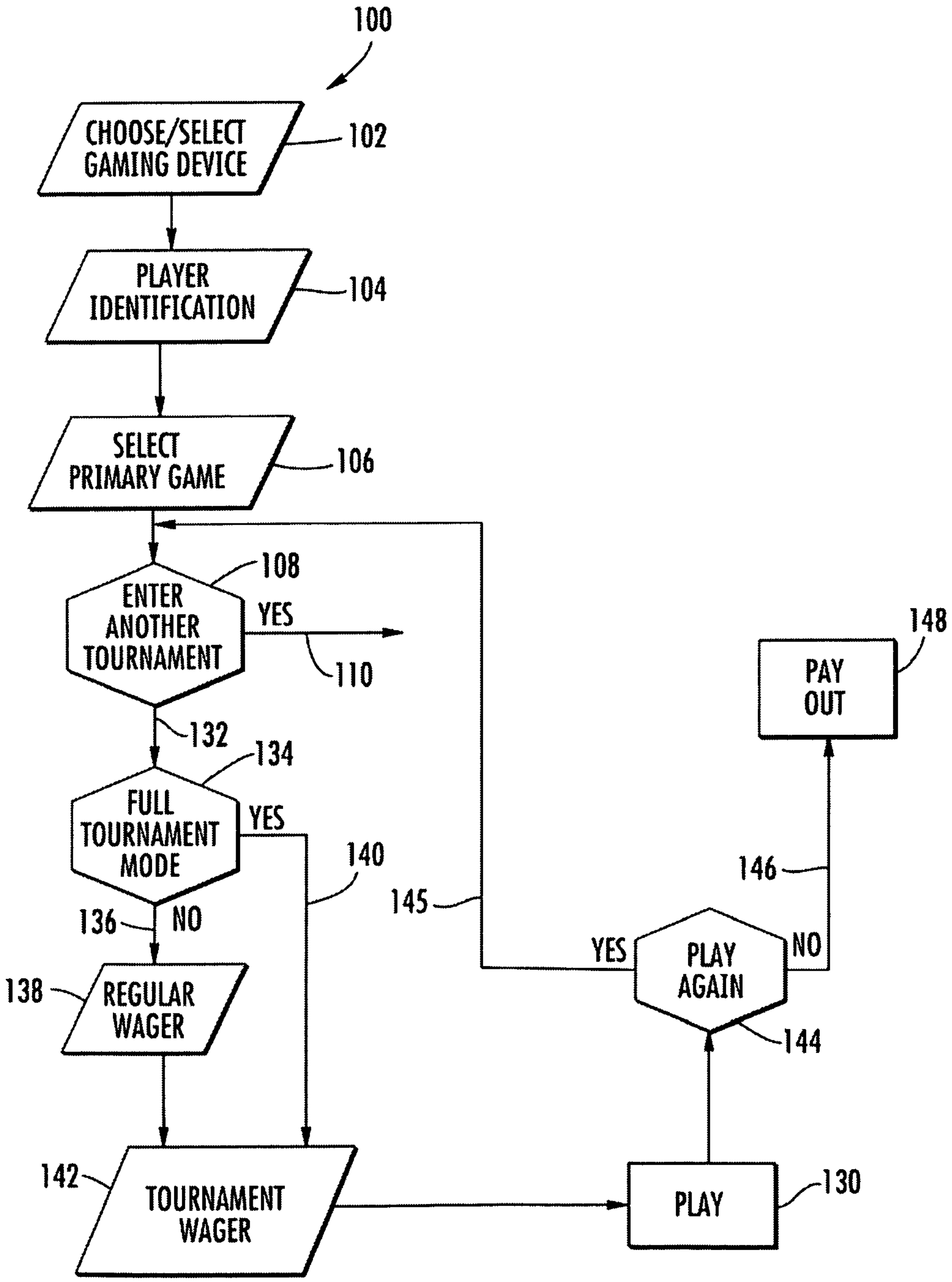
FIGS. 5 and 6 are substantially portions of a flow diagram of one embodiment of operating the system of FIG. 1.

FIG. 5 illustrates one embodiment of a method of conducting simultaneous tournament play 100 for operating the network gaming system 10 of FIG. 1. After entering a casino or gaming establishment, a patron may perform a choosing operation 102 by selecting a particular gaming device 12-16 to play. In a registering operation 104, the player may enter their identification information which may be stored in the player register 34 of server 20. Following registration, gaming device 12-16 may display several downloaded games 62 received from the server game storage 22, following which the player then selects one game in operation 106. The game selected in operation 106 then becomes the primary, base, or regular (i.e. non-tournament) game.

Figure 6:
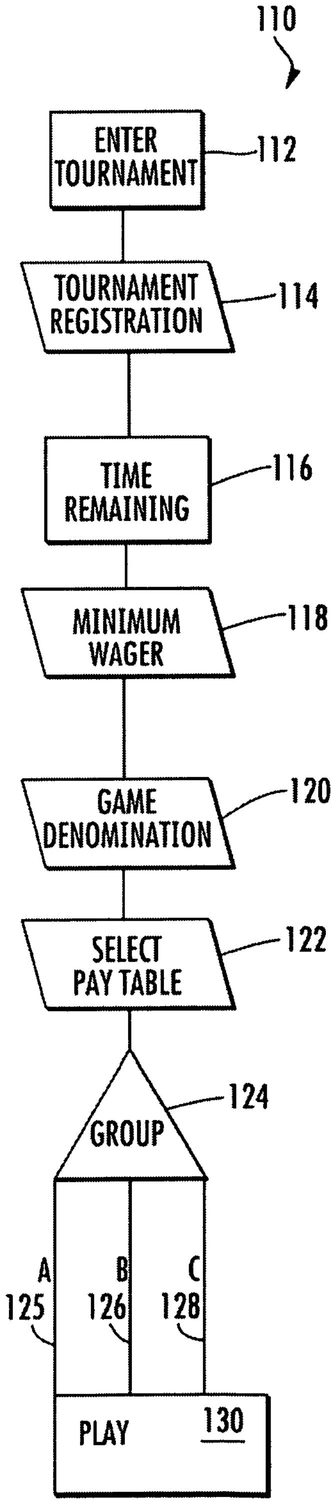

Following selection of the regular game, a player is given the option to enter another tournament in operation 108. If a player decides to enter a tournament, operation 108 issues a YES signal 110. Referring now to FIG. 6, YES signal 110 is received by an enter tournament operation 112, which is followed by a register for tournament operation 114 or player information may be stored in player register 34. After consulting with the tournament scheduler 30 to determine when to enter the tournament again, in a time remaining operation 116, the amount of time left in the tournament is transmitted as message 64 to a selected gaming device 12-16 and presented on display 60, as shown in FIG. 3.

Various items concerning the tournament are then monitored and stored in tracker 36. For example, in a wagering operation 118, the actual wager made, as well as the minimum wager required, are stored for both the regular game and the tournament entered. In a game denomination operation 120, the particular denomination, e.g. nickel, quarter, dollar, etc. gaming device 12-16 is set to receive his stored in tracker 36. The particular pay table storage 24 associated with the selected gaming device 12-16 is also stored in tracker 36. Other items concerning the tournament may also be monitored and stir with in tracker 36, such as a player's start time.

In a grouping operation 124, different tournament players may be arranged according to criteria stored in tracker 36. For example, tournament players may be placed in Group A in operation 125, Group B in operation 126, Group C in operation 128, etc. The groupings may be based on one or more of the following criteria: wager denomination, minimum wager, actual wager, pay table, start time, number of tournaments in which a player is currently entered for simultaneous tournament play, etc. Following arrangement of the tournament players into their various groupings 125-128, actual game play 130 is then conducted and gaming devices 12-18 perform a local game cycle wherein the player initiates a play sequence and the performs the primary game.

Returning now to FIG. 5, if when given the option to enter (another) tournament 108 a player declines, a NO signal 132 is issued to a full tournament mode query operation 134. In operation 134, a player is offered the option of entering full tournament mode where regular wagers and regular prizes are suspended in favor of tournament wagers and tournament prizes. If the player decides not to enter full tournament mode, a NO signal 136 is issued and message 64 is sent to gaming device 12-16 indicating that a player needs to place a regular wager in operation 138. If in query operation 134 a player is authorized and is offered the opportunity to decide to enter a full tournament mode, upon acknowledgment of entering full tournament mode a YES signal 140 is issued to deliver message 64 to gaming device 12-16 indicating that a player needs to place a tournament wager in operation 142. Note that in full tournament mode 140, placement of a regular wager in operation 138 is bypassed. Following entry of the tournament wager 142, and the regular wager 138 when not in full tournament mode, these wagers are monitored and tracked by operation 118 (FIG. 6).

Following gameplay 130 on one of gaming devices 12-16, a player is given the option of playing again in operation 144. If a player decides to play again, operation 144 issues a YES signal 145, and the player is again given the option of entering another tournament in operation 108, and gameplay continues as described above. If a player decides not to play again in operation 144, a NO signal 146 is issued to a payout step 148, which may be conducted by payout device 18 as described above.

Figure 7:
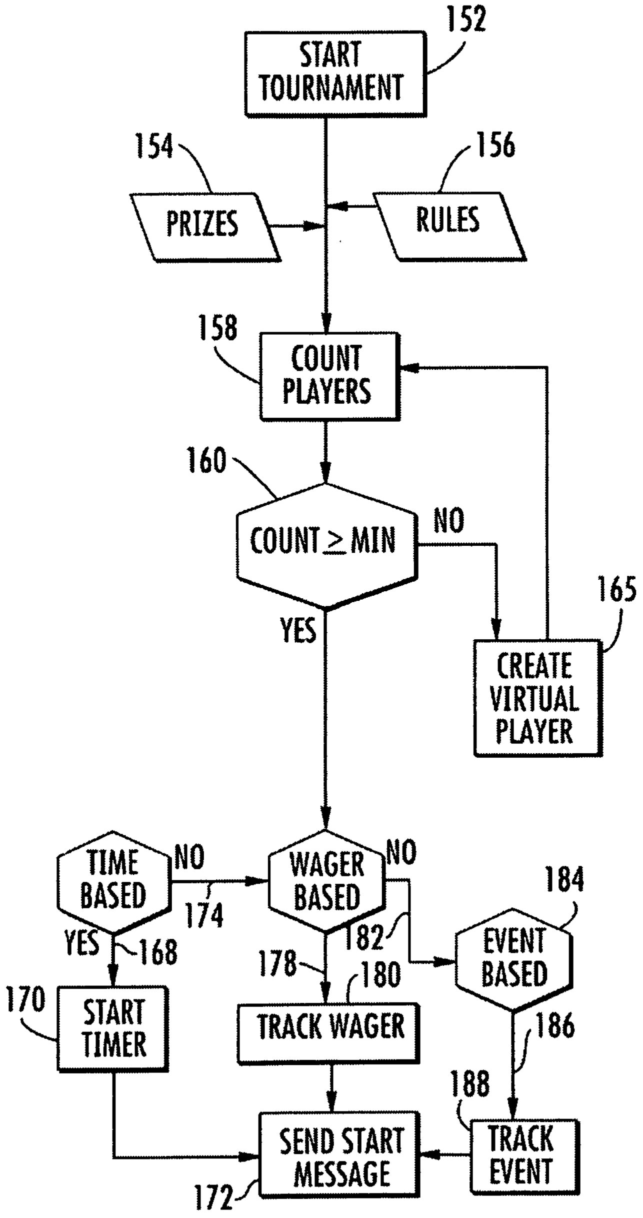
FIG. 7 is substantially a flow diagram of one embodiment of operating tournament portion of the gaming system of FIG. 1.

While FIGS. 5 and 6 deal with initiation and tracking of tournament play, as well as regular play, FIG. 7 illustrates one of embodiment of a method of conducting a tournament 150. A start tournament step 152 receives a list of tournament prizes 154 from server prize payouts 28, along with a set of game rules and/or payout rules 156 from pay table storage 24. All of the tournament register players are counted in operation 158.

In a comparison operation 160, it is determined whether the player count 158 is greater than, or equal to, a minimum number of players required for conducting a particular tournament. If so, the comparison operation 160 issues a YES signal 162. If not, comparison operation 160 issues a NO signal 164 which is perceived by a create virtual player operation 165. The create virtual player operation 165 creates a virtual player and the quantity of players is compared to the minimum number required at step 160. Additional virtual players are created at step 165 until the minimum number of players required for a tournament are registered.

Figure 8:
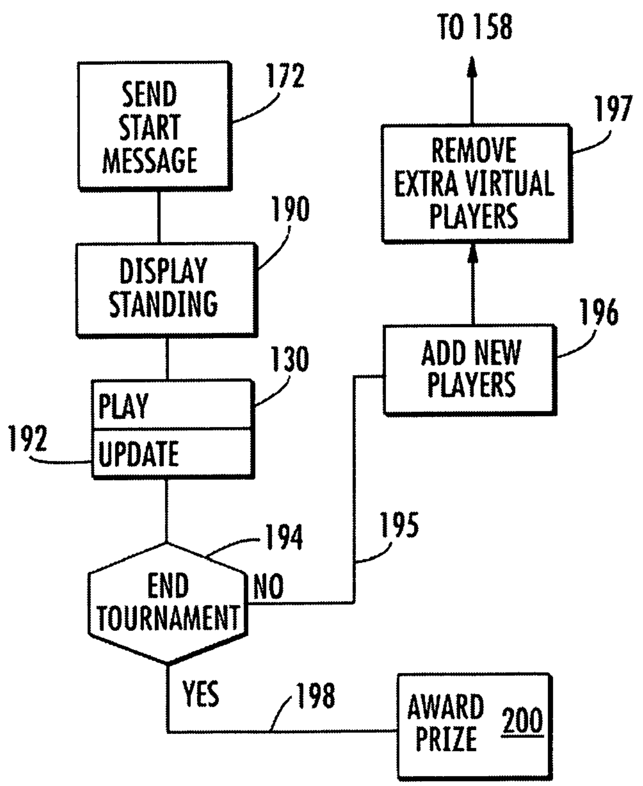
FIG. 8 is substantially a flow diagram of one embodiment of operating tournament portion of the gaming system of FIG. 1.

Referring to FIG. 8, the start message sent at step 172 is followed by a display of the player's standing 190. The game is played 130 and the tournament statistics are updated 192. If the tournament has ended 194, 198 the prize is awarded 200 to the winner. If the tournament is not ended 195 the system checks to see if new players are waiting to be added 196.

Excess virtual players are removed 197 to maintain the minimum number of virtual players needed to create a tournament group of players with a quantity of players equal to or greater than the minimum number of players required for a particular tournament. The number of virtual players creates a sequel to the player deficiency between the minimum required and actual number of players. The server random number generator 38 is used to simulate gameplay of each virtual player in the tournament.

Continuing to refer to FIG. 8, once the minimum number of players is met or exceeded, be they all actual players or actual and virtual players, a determination is made as to what type of tournament is being played. YES signal 162 is received by a time-based query 166, which determines whether the tournament is a time-based event. If so, a YES signal 168 is issued to a start timer operation 170, and a send start message operation 172 sends a start message 64 to each of the gaming devices 12-16 which are entered in the tournament.

If the tournament is not a time-based event, operation 166 issues a NO signal 174 to a wager-based query operation 176. In a wager-based tournament, a winner may be the person to place the highest number of wagers, or the highest amount of money wagered, for example, for regular or tournament games or both. If the tournament is wager based, a YES signal 178 is issued to a track wager operation 180 which monitors and stores wager information in the server tracker 36. Following initiation of the wager tracker 180, the send start message operation 172 is conducted.

If the tournament is not a wager-based event, operation 166 issues a NO signal 182 to an event-based query 184. If the tournament is event-based, operation 184 issues a YES signal 186 to an event tracker 188. The event tracker 188 may track events related to the type of game being played. For instance in a slot machine the event may be hitting three red sevens, while for a video poker machine, the event may be hitting four of a kind, or a royal flush. Event tracking is then initiated in operation 188 so events are stored in tracker 36, and the send start message operation 172 is conducted.

After sending the start message 172, in a send standing display operation 190, the tracker 36 may send tournament player standing information to be shown on display 60 as player standing 65. This may be followed by gameplay 130, after which an update operation 192 is to update the various items being tracked and stored in tracker 36, according to the tournament or simultaneous tournaments being played. Following the updating operation 192, a tournament end query 194 is conducted. Operation 194 issues a NO signal 195 to an add new player operation 196, after which the update operation 192 registers the new player. If the tournament has indeed ended, operation 194 issues a YES signal 198 to an award prize operation 200, which refers to the designated pay table storage 24 and awards tournament prize 58 to the tournament winner using payout device 18, as described above. If the winning player is a virtual player, the house retains the prize.

In one embodiment, the system is configured to allow players to enter a tournament every minute so that each player's play on the base game is also being registered for purposes of his or her standing in a number of different tournaments at any given time. The tournament games may be conducted for a set period of time after which the patron with the most credits may be deemed the winner and awarded a predetermined prize. The server may register each player's play and take into consideration denomination of the games being played and the pay table so as to fairly calculate the winner of each tournament. In another embodiment, the server is configured to group players according to various characteristics, such as their denomination, the pay table being used or minimum wager per game.

Since each player is making wagers to participate in the tournaments in addition to the wagers placed to play the primary game, the system may be configured to give each player an option to not make wagers on the primary game so that the gaming device is only playing in full tournament mode and is not playing a primary game for local payout. For example, if the condition to enter full tournament mode is a player has wagered a certain amount, the player may optionally elect to enter the tournament having the gaming device in full tournament mode in which no further wagers on the primary game are necessary. When a machine is in full tournament mode, any credits registered on that gaming device would not result in payouts on the base game, but would only be registered for purposes of the player's standing in the tournament.

The present invention may operate as follows. When a player first arrives at a gaming device, the play can enter a tournament by placing an additional wager. The player may also be presented with different kinds of tournaments in which case the player may indicate a selection using a player input device, such as a touch screen or button. The player may also be required to enter personal identifying information, which may be accomplished by swiping a player tracking card. The server would indicate on a display on the gaming device when a tournament is to begin. This may be presented as a counter timer type display. The player may also be given the option to play different primary games which may be downloaded from the server to the gaming device.

Once the tournament begins, every primary game the player plays on the gaming device would be recorded and the player would be competing with other players who have also registered for that same tournament. After a period of time, the system may announce that a second tournament is beginning and the player may enter an additional wager to enter the second tournament. Play on the primary game would be tracked to determine the player's standing in that second tournament as well. Additional tournaments may be offered and the player may enter these tournaments so that the player may be playing in many tournaments simultaneously.

During the tournament, the gaming device may display the standing of the player in the tournament so that the player will know if he is winning or losing. In many cases, the player may appear to be losing but feel that lie can catch up. Because the system of the present invention is capable of operating many tournaments simultaneously, prizes are awarded frequently and this creates a great deal of excitement among the players.

After a player has wagered a predetermined amount on tournament games, the server may send a message to the player's gaming device that the player is eligible to enter full tournament mode. In one embodiment, the player is given an option to enter this mode. If the player selects this option, the player will not be required to use his credits or make any additional wagers to play the primary game. As discussed above, credits wagered on the primary game can only be used for purposes of the player's standing in the tournament.

In the event that there are less than a predetermined number of players registered to play in a tournament, the system of the present invention is capable of stimulating other players to enter the tournament. For instance, a particular tournament may be designed for at least ten players. If less than ten players are registered, the system may be configured to fill the empty spots with virtual players. The system may use a random number generator to determine the play of the virtual players. In the event that a virtual player wins a tournament, the tournament prize would be retained by the system operator.

The present invention increases player excitement and encourages players to play more and play longer. This in turn will generate more revenue for the system operator.

Those of skill in the art will recognize that the nature of the qualifying event can be any of the above embodiments, or additional embodiments within the skill of the person of ordinary skill in the art. Combinations of qualifying events could also be used as winning criteria. Those of skill in the art will also recognize that multiple qualifying events could be used simultaneously, potentially with different prizes. Those of skill in the art will recognize that the above steps can occur in a different sequence and that different steps can be included and that certain steps can be omitted in the method and still fall within the scope of the present invention

What is claimed is:

1. A network gaming system, comprising:

a server having a plurality of regular games for selection by players of the gaming system, wherein the plurality of regular games are non-tournament games, and a plurality of tournament games for play by the players of the gaming system;

a plurality of gaming devices each in communication with the server, each gaming device is configured to:

provide game play of a selected regular game upon receipt of a selection of the selected regular game from the plurality of regular games by a player, enter the player into a first tournament game upon receipt of a first tournament wager by the player, and enter the player into a second tournament game upon receipt of a second tournament wager, wherein the first tournament game and the second tournament games are part of distinct first and second tournaments, the first tournament and the second tournament are simultaneously conducted, thereby allowing the player to simultaneously participate in the first and second tournament games, and present the player an option of entering a full tournament mode, wherein game play of the selected regular dame is suspended and dame play of the first tournament game and the second tournament game continues while in full tournament mode, and wherein game play of the regular game, the first tournament game, and the second tournament game continues when not in full tournament mode; and a payout system to award a regular game winning player a regular prize, and to award a tournament winning player a tournament prize.

2. The network gaming system of claim 1, wherein each gaming device communicates with the server to announce tournament starts, to monitor play of each tournament player, and to display standings of each tournament player.

3. The network gaming system of claim 1, wherein the server schedules plural overlapping tournaments each having a selected period of play.

4. The network gaming system of claim 1, wherein the server generates plural tournaments, with a master tournament comprising a group of plural tournaments and having a master tournament winner based on a selected criteria.

5. The network gaming system of claim 1, wherein upon receipt of an indication that the player elects to enter the full tournament mode:

the gaming device suspends receipt of the regular wager during tournament play; and the payout system suspends awarding of the regular prize.

6. The network gaming system of claim 1, wherein upon receipt of a selected amount of tournament wagers, the gaming device offers the tournament player an option to suspend regular wagers and forfeit regular prizes during tournament play.

7. The network gaming system of claim 1, wherein the gaming device requires the tournament player to enter personal identifying information which is communicated to the server.

8. The network gaming system of claim 1, wherein the server permits tournament play upon receipt of tournament wagers by a predetermined number of gaming devices.

9. The network gaming system of claim 1, wherein:

upon receipt of tournament wagers placed by a number of actual tournament players which is less than a selected minimum number of gaming devices, the server permits tournament play by including a number of virtual players, which when added to the number of actual tournament players equals the selected minimum number of gaming machines;

wagers and plays of each virtual player are determined by random number generation; and virtual player prizes are retained by the server.

10. A method of conducting tournament gameplay comprising:

offering a plurality of regular games for selection on a plurality of gaming devices;

offering a plurality of tournament games for selection on the plurality of gaming devices, the plurality of tournament games comprising a first tournament game and a second tournament game, wherein the first tournament game and the second tournament game are part of distinct first and second tournaments;

providing game play of a selected regular game on a gaming device of the plurality of gaming devices in response to receiving a regular wager on the gaming device;

providing game play of the first tournament game on the gaming device in response to receiving a first tournament wager on the gaming device;

simultaneously providing game play of the second tournament game on the gaming device in response to receiving a second tournament wager on the respective gaming device;

presenting an option of entering a full tournament mode via a display of the gaming device, wherein game play of the selected regular game is suspended and game play of the first tournament game and the second tournament game continues while in full tournament mode, and wherein game play of the regular game, the first tournament game, and the second tournament game continues when not in full tournament mode;

awarding, from a game controller, a regular prize to a winner of the selected regular game;

awarding, from a tournament controller, a first tournament prize to a winner of the first tournament game; and awarding, from the tournament controller, a second tournament prize to a winner of the second tournament game.

11. The method of claim 10, further comprising scheduling the plural tournament games with start times spaced for overlapping simultaneous play of at least two of the plural tournament games.

12. The method of claim 10, further comprising:

tracking gameplay factors; and using tracked gameplay factors to determine the winners of the first and second tournament games.

13. The method of claim 12, wherein the gameplay factors comprise at least one of the group comprising:

selected gaming events;

a total amount of first and second tournament wagers received during the respective first and second tournament games; and a total amount of first and second tournament prizes received during the respective first and second selected tournament games.

14. The method of claim 10, further comprising grouping tournament players into different tournament games based on game criteria.

15. The method of claim 14, wherein the game criteria comprises at least one of the group comprising:

minimum wager denomination;

a selected pay table used for at least one of the selected regular game, the first tournament game, and the second tournament game; and a start time of the first and second tournament games.

16. The method of claim 10, further comprising:

counting a number of players entered in a selected tournament game; and when the counted number of players equals or exceeds a minimum number of players, starting play of the selected tournament game.

17. The method of claim 10, further comprising:

counting a number of actual players entered in a selected tournament game;

when the counted number of players is less than a minimum number of players, creating a number of virtual players which, when added to the number of actual players, equals the minimum number of players; and randomly generating a play result for each of the virtual players.

18. A network gaming system, comprising:

gaming means for providing game play of a regular game of chance;

tournament means for simultaneously providing game play of a plurality of tournaments comprising, the plurality of tournaments including a first tournament game and a second tournament game, wherein the first and second tournament games are part of distinct first and second tournaments;

controller means for simultaneously conducting the plurality of tournaments;

display means for presenting players an option of entering a full tournament mode on a gaming device, wherein game play of the regular game is suspended and game play of the first tournament game and the second tournament game continues while in full tournament mode, and wherein game play of the regular game, the first tournament game, and the second tournament game continues when not in full tournament mode; and payout means for awarding a regular prize to a regular game winner, and a tournament prize to a tournament winner.

19. The network gaming system of claim 18, further comprising:

(A) counting means for counting a number of actual players entered in a selected tournament;

(B) determining means for determining whether the counted number of actual players meets or exceeds a minimum number;

(C) virtual means for creating a number of virtual players which when added to the number of actual players meets the minimum number; and (D) means for generating random play results for each of the virtual players.

20. The network gaming system of claim 19, further comprising: means for removing virtual players as new registered players are added to minimize the number of virtual players while maintaining the minimum number of players in the tournament.

21. The network gaming system of claim 18, further comprising:

tracking means for monitoring and storing play factors for each player entered in at least one of the plural tournaments; and calculating means for designating the tournament prize in response to play factors for each of the entered players.

22. The network gaming system of claim 18, further comprising means for entering full tournament mode, comprising:

means for suspending regular waging on the regular game of chance; and means for suspending awarding of regular prizes.

23. The network gaming system of claim 18, further comprising:

means for grouping players by game factors into two or more groups each playing one of the plural tournaments; and calculating means for designating the tournament prize in response to game factors for each gaming means played by entered players.

* * * * *